United States Patent [19]

Heymann

[11] 4,192,036

[45] Mar. 11, 1980

[54] APPARATUS FOR PROCESSING THE SURFACE OF BODIES HAVING IRREGULAR CONTOURS

[76] Inventor: Friedhelm Heymann, Thranestrasse 90, D-4600 Dortmund 12, Fed. Rep. of Germany

[21] Appl. No.: 926,159

[22] Filed: Jul. 19, 1978

[30] Foreign Application Priority Data

Jul. 22, 1977 [DE] Fed. Rep. of Germany ....... 2733091

[51] Int. Cl.$^2$ .............................................. B60S 3/06
[52] U.S. Cl. ............................ 15/53 AB; 15/DIG. 2; 15/181
[58] Field of Search .................. 15/21 D, 21 E, 53 A, 15/53 AB, DIG. 2, 179, 181, 82, 79 R, 79 A, 83

[56] References Cited

U.S. PATENT DOCUMENTS

| 911,702 | 2/1909 | Carroll | 15/179 |
|---|---|---|---|
| 1,867,728 | 7/1932 | Card, Jr. | 15/179 X |
| 1,903,867 | 4/1933 | Lehmann | 15/179 |

Primary Examiner—Edward L. Roberts
Attorney, Agent, or Firm—Fogiel Max

[57] ABSTRACT

An arrangement for processing surfaces of bodies having irregular contours, in which a rotating body driven by a shaft guided in it, is held against the surface to be processed. A plurality of sections are held against the body, and the shell surface of the rotating body is the carrier for the means for processing the surface. The sections of the rotating body are eccentrically penetrated by a drive shaft on which drive wheels acting from the inside on one section apiece are arranged. At least one guide is easily tilted relative to the drive shaft and the section supported by it. The rotating body sections are rigid hollow cylinder sections, and the drive wheels are the friction wheels contacting the hollow cylinder sections. The drive wheels, furthermore, are guided in a recess on the inside of the hollow cylinder sections. The drive wheels may be pinions engaging internal gear rings associated with the hollow cylinder sections.

16 Claims, 6 Drawing Figures

APPARATUS FOR PROCESSING THE SURFACE OF BODIES HAVING IRREGULAR CONTOURS

BACKGROUND OF THE INVENTION

The present invention relates to an apparatus for processing the surface of bodies having irregular contours in the form of a body of rotation driven by a shaft guided in it, and held against the surface to be processed. It consists of a plurality of sections held against the body to be processed, the shell surface of which body is the carrier for the means for processing the surface.

Such apparatus is being used, for example, in car wash installations. In such wash installations, rotating wash brushes which extend in the horizontal and vertical directions and are laid out for the height and width of the current passenger automobile chassis, clean or wash the vehicle passing through the wash installation using water and detergents. They may be followed by polishing brushes. The layout of the brushes must be adaptable to various dimensions, and if possible to different chassis shapes. This can be realized roughly with a programmed control influencing the brush layout. Vehicle contours deviating from the vertical are accommodated by a suitable inclination of the brushes, and also by providing the brushes with very long bristles so that with proper installation, even recessed or offset surface portions are reached. One must accept, however, that the bristles striking the projecting or raised surface portions are bent over. This proves to be a disadvantage insofar as it impairs the cleaning effect of the bristles which is optimally achieved by the bristle tips. There also has been proposed a multipart wash brush for cleaning the roof of busses, etc., whose sections adapt to the roof curvature (British Pat. No. 757,722). The brush sections are internal cylindrical and outer cone-shaped brush bodies arranged rigidly on flexibly connected drive shaft sections. This wash brush when held against the vehicle roof to be cleaned adapts to the roof contours in such a way that the off-center sections of the wash brush are lowered to a greater extent. Under their own weight, including the weight of the drive shaft sections, the wash brush sections contact the surface to be cleaned. These lead again to the bending of bristles, impairing the cleaning effect of the brushes. Also, the possibility of dividing such a wash brush is limited by the otherwise acceptable expensive construction; hence their adaptability is also limited. Finally, an individual adaptation of the brush sections to surfaces essentially extending in the vertical direction, such as the side surfaces of chassis, cannot be accomplished.

The problem of adaptability of rotating bodies, having processing means on their surface, to the contours of the body to be processed has been explained above for the known application "carwash and polishing brushes"; but it also appears in other subject areas. It arises when cleaning castings, the reworking of ceramic goods and products of wood and plastic; and hence generally with the processing of bodies having irregular contours, or of surfaces having contours.

It is the object of the invention to solve the problem of individual application to surfaces having contours during the processing of such surfaces by means of a rotating body whose shell surface is the carrier of processing means or is formed from processing means in such a way that all surface portions to be processed are processed optimally.

SUMMARY OF THE INVENTION

The problem is solved with a device of the type described above which is characterized in that the sections of the body of rotation are penetrated eccentrically by a drive shaft on which drive wheels acting on only one portion are arranged, as well as at least one guide which is easily turned relative to the drive shaft and relative to the portion supported by it.

The driven sections of the rotating body, under the action of the torque produced by the drive, perform individual tilt motions about the drive shaft; these motions are restricted by the contact of the section with the surface portion to which it is applied; the result is that with sufficient subdivision of the rotating body, virtually all surface portions are optimally processed even with pronounced contours, both across the height or width of the surface to be processed and along its length, since the alignment of the sections automatically adapts to the contours.

The coarse alignment can be made in a known manner by displacing the rotating body as a whole against the surface to be processed and, if required, by a suitable tilting of the rotating body.

There also is possible a mode of operation where at first all sections of the rotating body in operation are pivoted forward a maximum amount, and the individual sections are then tilted back by the body to be processed in accordance with the surface contours.

With rotating bodies lined with brushes, the pivotal motion caused by the torque is already restricted by the contact of the bristle tips with the surface to be processed, so that the full cleaning strength of such brushes is maintained. With properly shaped brushes, relatively short bristles are sufficient in an advantageous manner.

Preferably, the sections of the rotating bodies consist of rigid hollow cylinder sections. The drive of the hollow cylinder sections can be achieved by pinions located on the drive shaft; these pinions engage internal gear rings associated with the hollow cylinder sections. Particularly low wear results from driving the hollow cylinder sections with friction wheels guided in a circular channel on the inside of the hollow cylinder sections.

According to a modified embodiment, the sections of the rotating body consist of endless belts, similar to drive belts, in contact with drive wheels and idler wheels at some distance from them. In an expedient manner, the drive wheels and idler wheels are fluted and the belts have the form of V-belts. To increase traction, the running surface, particularly of the drive wheels, may be roughened.

The construction of the guides may vary within the limits. It may be a disk provided with recesses for the drive and with a possible tilt restriction, —in the extreme case a ring with an inward projecting bulge with a passage for the driveshaft; but it also may be an arm mounted on the driveshaft whose free end has supports in contact with the rotating bodies. With rotating body sections formed of revolving belts, a greater pivotal range is achieved if the guides project sideways over the drive wheels at the drive level so that contact of the belts can be made only on the rear side of the drive wheels. This can be omitted when the idler wheel (or deflection wheel) is much larger than the drive wheel.

With smaller rotating body sections, a guide in the rear of the rotating body section at the drive wheel level is sufficient. If the sections are higher (wider), two guides extending on both sides of the drive are required, their position relative to each other is suitably fixed.

To ensure easy running of the guides on the driveshaft and of the rotating body sections relative to the guides, the guides may be arranged on the driveshaft by using roller and ball bearings. Similarly, the guides may have rollers for supporting the rotating body sections. To bring about and maintain a free space between the sections, required for the unimpaired individual tilt mobility of the rotating body sections, spacer sleeves may be provided which are located on the driveshaft and are in indirect or direct contact with the drive wheels.

A stop extending through the rotating body sections limits the tilt motion of the sections and prevents their unwanted complete revolution. The stop is suitably adjustable to various tilt ranges.

Furthermore, restoring springs counteracting the pivotal motion of the rotating body sections may be provided; when the apparatus stands still, they cause the sections to pivot back to the initial position. In order that the restoring spring does not impair the desired pivotal motion of the section, a spring with free play may be provided. However, if required, the spring may be used also for reducing the pivotal force.

The applications described above without or with restoring spring, result in a particularly careful treatment of the surface to be processed. In addition, it saves processing means such as bristles, polishing disks, etc.

In a further embodiment, the apparatus in accordance with the present invention may also be provided with restoring springs acting on the rotating body sections; these springs prevent a pivoting of the sections by the torque caused by the drive. With the apparatus in operation, the sections are first pivoted individually by the body to be processed, brought up against the rotating body, against the spring force. Depending on the strength of the pressing spring, one can in this manner, achieve a surface treatment which requires a greater pressure of the processing means against the surface to be processed than is required for grinding and polishing workpieces. The effect of automatic resetting with progressive wear of the processing means proves to be an additional advantage.

With the device in accordance with the present invention, it is also possible to advantageously relocate the supply of cleaning water to the inside of the rotating body and to apply water exiting from the jacket surface to the surface to be processed. This makes possible a planned water supply, resulting in a considerable saving of water. In addition, the spray formation resulting with the known water supply from the outside disappears. The water supply can be integrated with the stop limiting the tilt motion of the cylinder section.

The invention is described with exemplary embodiments in the drawings. These show:

BRIEF DESCRIPTION OF THE DRAWINGS

FIG. 3 is a partially broken-open top view of the hollow cylinder portion in FIG. 2, on a smaller scale;

DESCRIPTION OF THE PREFERRED EMBODIMENTS

Figure 1:
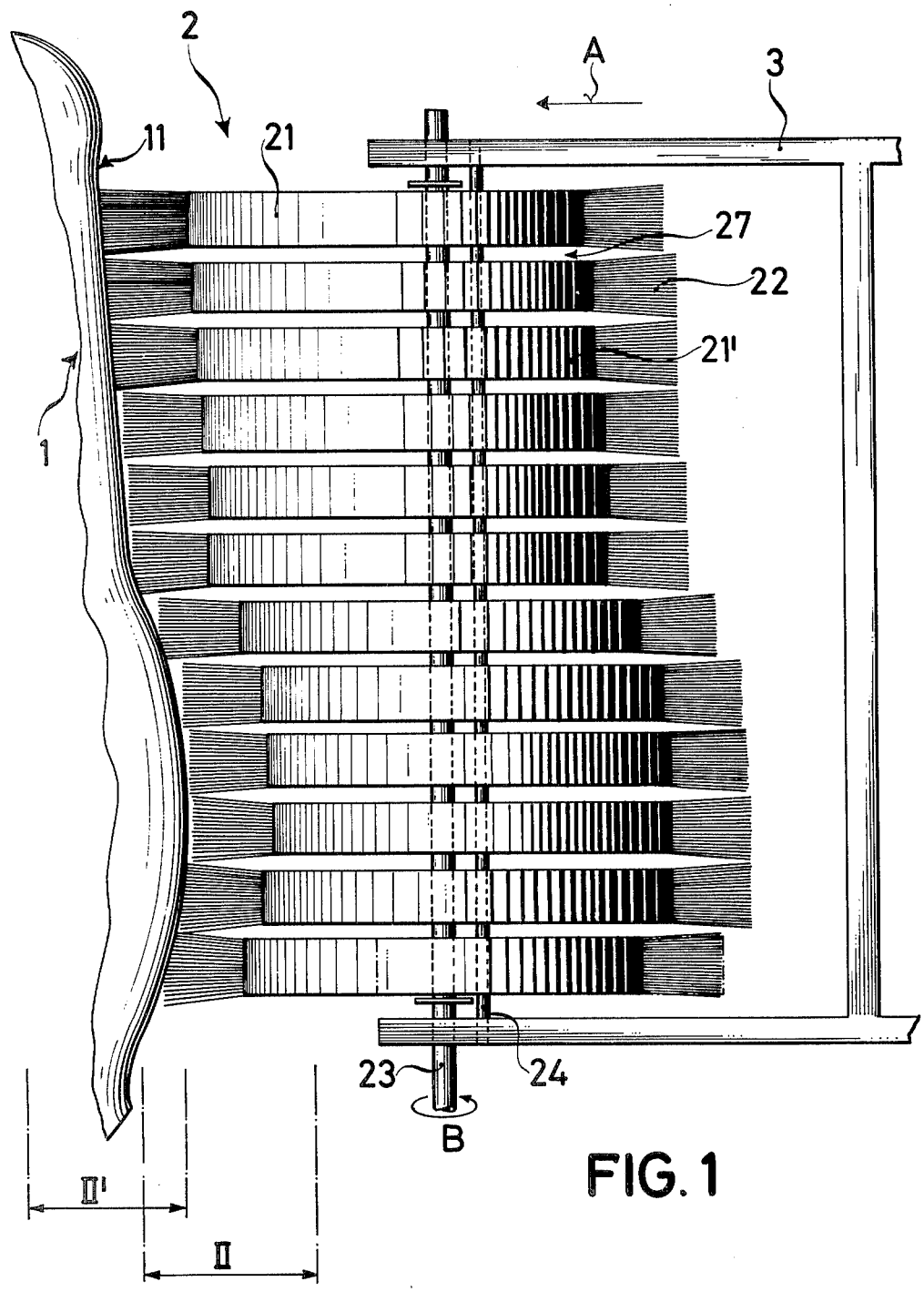
FIG. 1 shows a schematic of a wash brush for a passenger vehicle divided into hollow cylinder portions forming sections of bodies of rotation and carrying bristles in accordance with the present invention.

FIG. 1 shows a schematic of a wash brush 2 applied to the side 1 of a motor vehicle, mounted in a frame aimed in the direction of the surface 11 to be cleaned (arrow A). Of the wash brush 2, one can see the cylinder sections 21, 21' . . . lined with bristles 22 along the periphery, and the common drive shaft 23 extending eccentrically through the cylinder sections 21, 21' . . . with a sense of rotation according to arrow B and the stop 24 restricting the tilting motion (arrow C) of cylinder sections 21, 21'.

Figure 2:
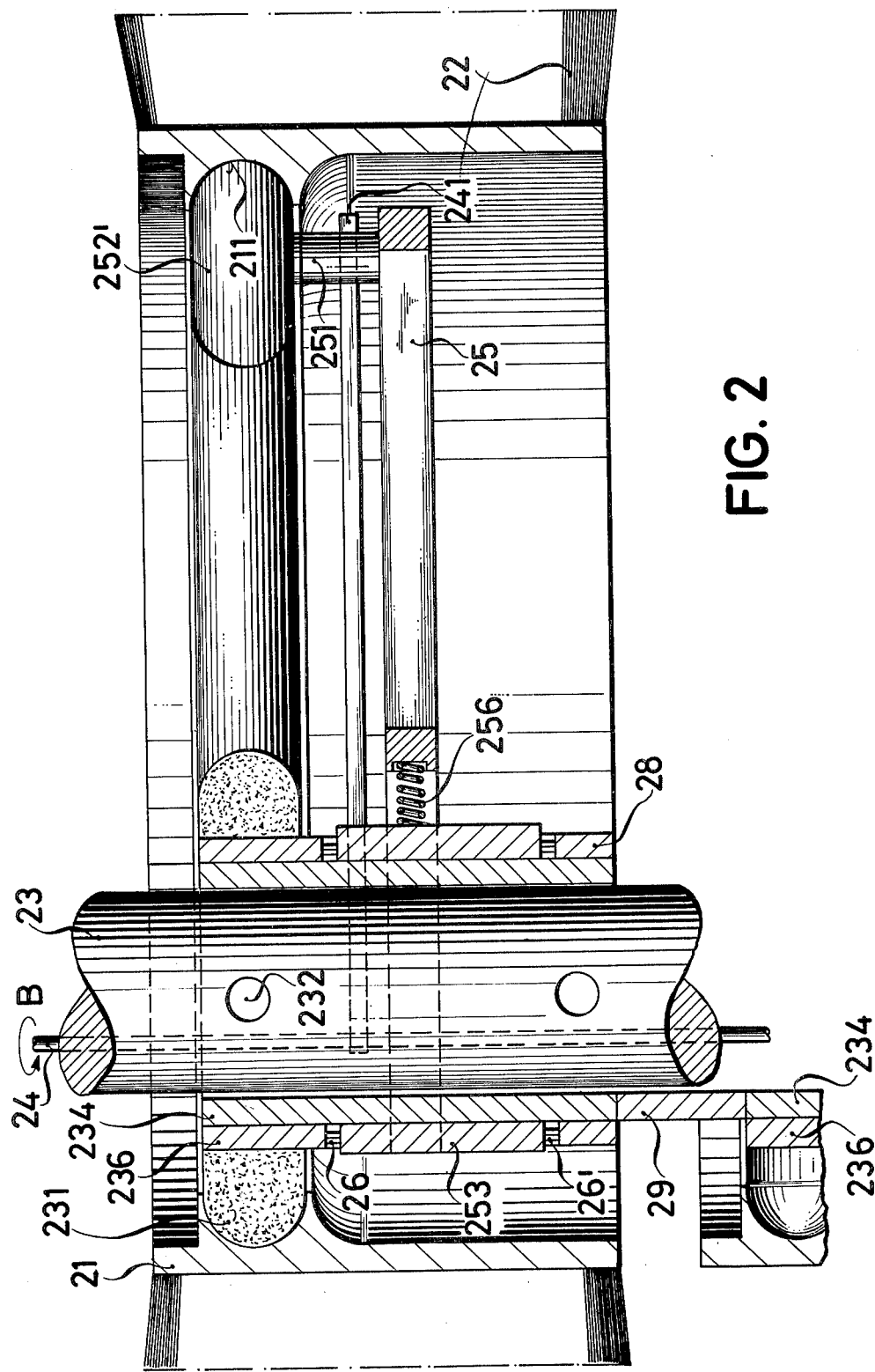
FIG. 2 shows a vertical section through an embodiment of a hollow cylinder portion forming a section of a body of rotation in accordance with the present invention on a larger scale.
Figure 3A:
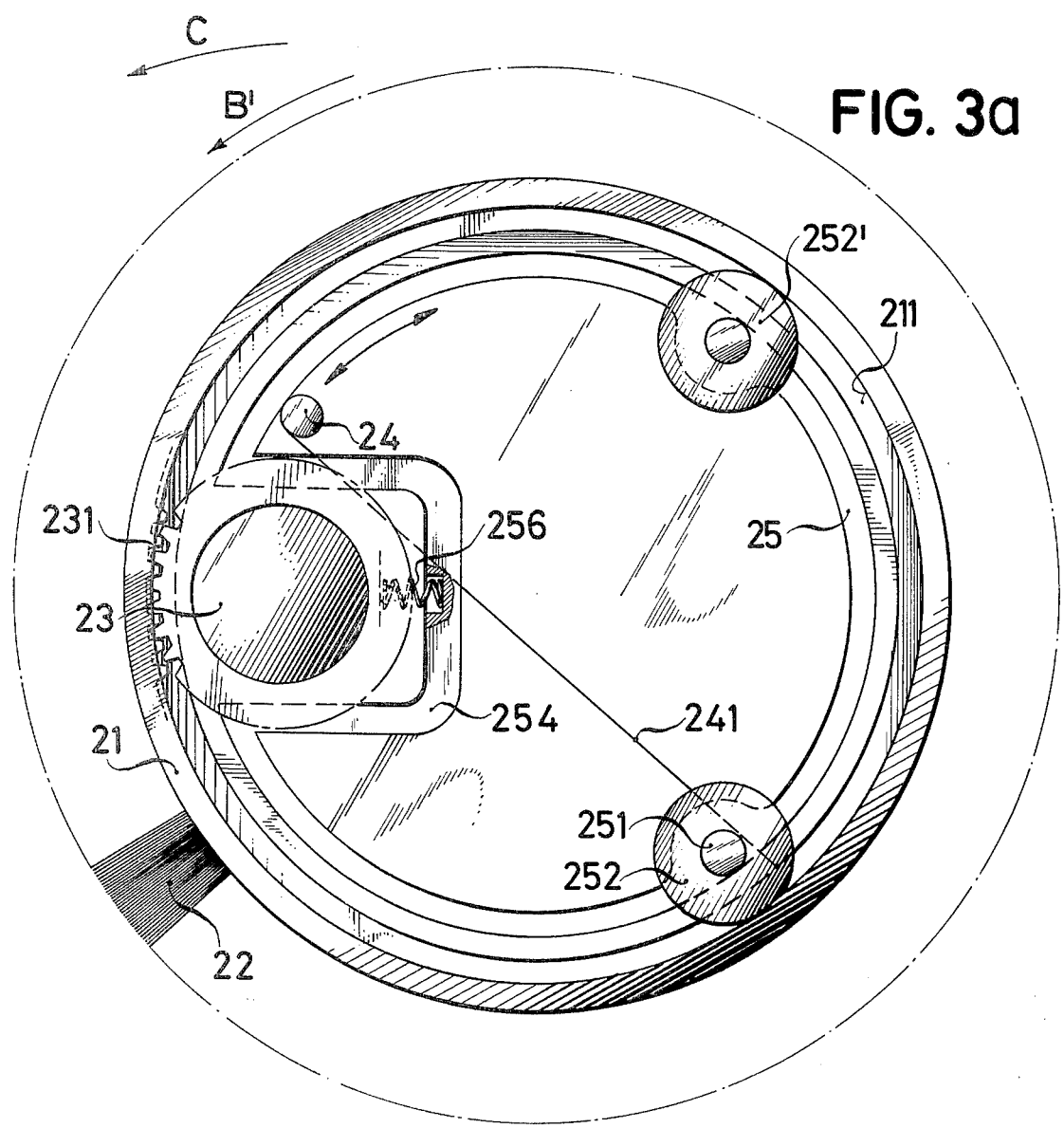
FIG. 3a shows a gear connection between drive wheel and hollow cylinder.

The cylinder portion 21, lined on the periphery with bristles 22 according to FIGS. 2 and 3, is provided at the inside with a circular channel 211. This circular channel is in contact with a friction wheel 231 rigidly mounted (232) on the driveshaft 23 and driving the cylinder section 21 in the direction of arrow B', and rotary contact rollers 252 and 252'; the annular guide 25, located in a rotary manner on driveshaft 23, is held in contact with the cylinder section via these rollers.

In the embodiment shown, the driveshaft 23 has a surface-treated running sleeve 234 on which the friction wheel 231 with rim 236 is rigidly arranged and a bushing 253 with an embedded guide 25 is rotatably mounted. A thrust washer 26 is inserted between rim 236 and bushing 253. The bushing 253 is fixed on the shaft or the sleeve 234 by a guide ring 28, with another thrust washer 26' between bushing 253 and guide ring 28.

The gap 27 (FIG. 1) between adjacent cylinder sections 21, 21' . . . is ensured by a spacer sleeve 29 in contact with the sleeves 234 of adjacent cylinder sections 21.

The frictional connection between friction wheel and cylinder section 21 is caused by a spring 256 acting on the driveshaft 23 and held in guide 25 which has a detent recess 254 for this purpose.

The stop 24 restricting the pivotal motion of cylinder sections 21, 21' . . . is provided with leaf springs causing a return of cylinder sections 21, 21' . . . to the initial position; the free ends of these leaf springs contact axis 251 which is part of guide 25 and mounts support roller 252.

The wash brush 2 or frame 3 in which wash brush 2 is mounted is advanced so far in the direction of the chassis surface 11 to be cleaned (arrow A in FIG. 1), that the maximum remaining space (D in FIG. 1) between the wash brush 2 and the chassis surface 11 can be bridged by the progressive displacement of cylinder sections 21, 21' resulting from the tilting (arrow C in FIG. 3) of the cylinder sections 21, 21' . . . in the direction of chassis surface 11, so that an individual adaptation of the individual cylinder sections 21, 21' . . . to the surface portions of chassis surface 11 up to a difference D' (FIG. 1) in the vertical direction can be made.

When the wash brush 2 is in operation, the driven cylinder sections 21, 21'... are not only set in rotation (arrow B' in FIG. 3), they also moved in a plane about the axis under the action of the torque caused by the drive (arrow C in FIG. 3). The pivotal motion is restricted individually by the contact of the wash bristles 22 with the corresponding surface portions of the chassis surface 11 to be cleaned, so that all surface portions participate in the optimum cleaning effect of the wash bristles 22, independently of the direction A of the wash brush 2 towards the chassis surface 11.

Figure 4:
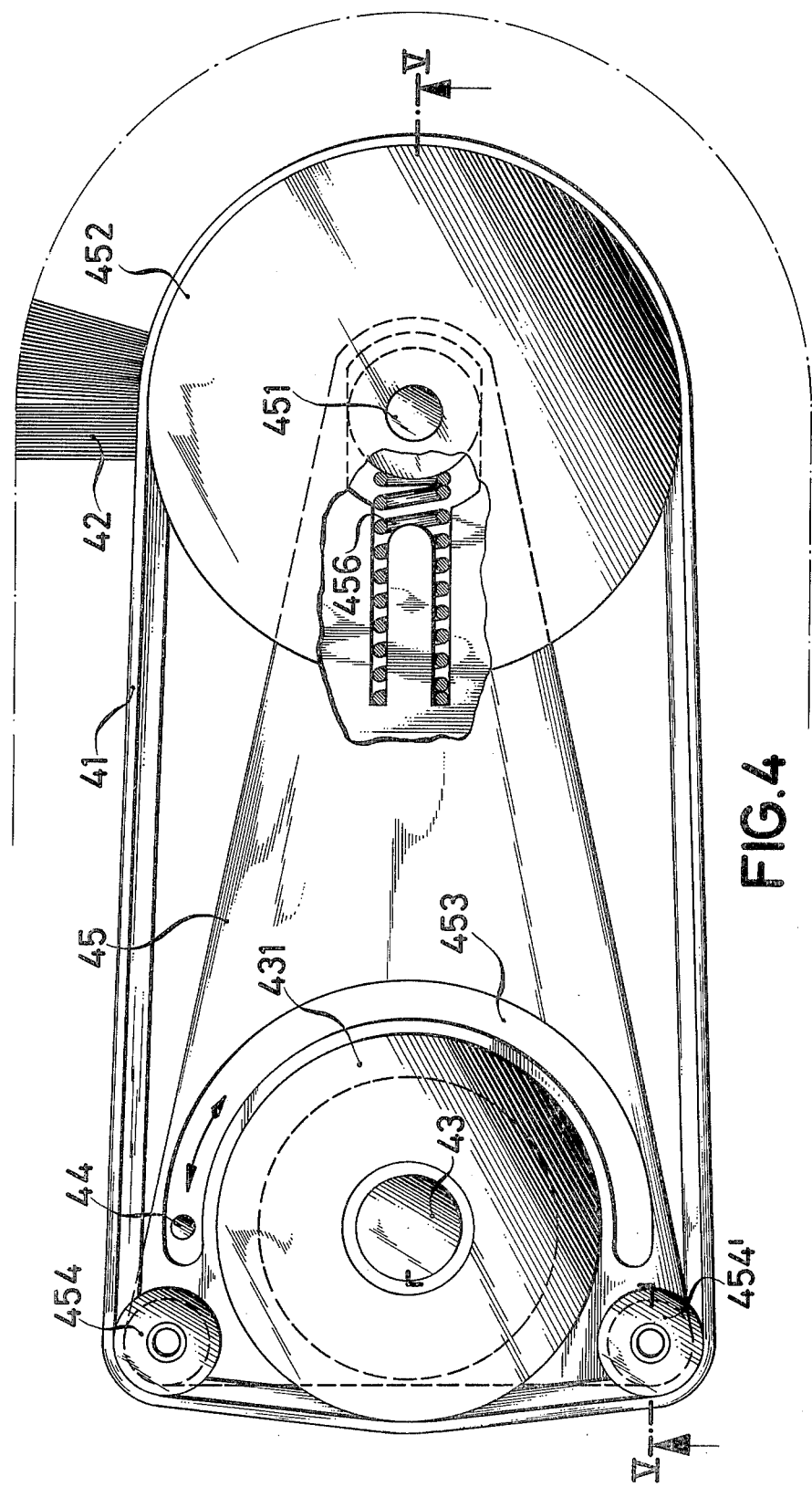
FIG. 4 shows a top view of a section of a body of rotation using an endless belt as jacket.
Figure 5:
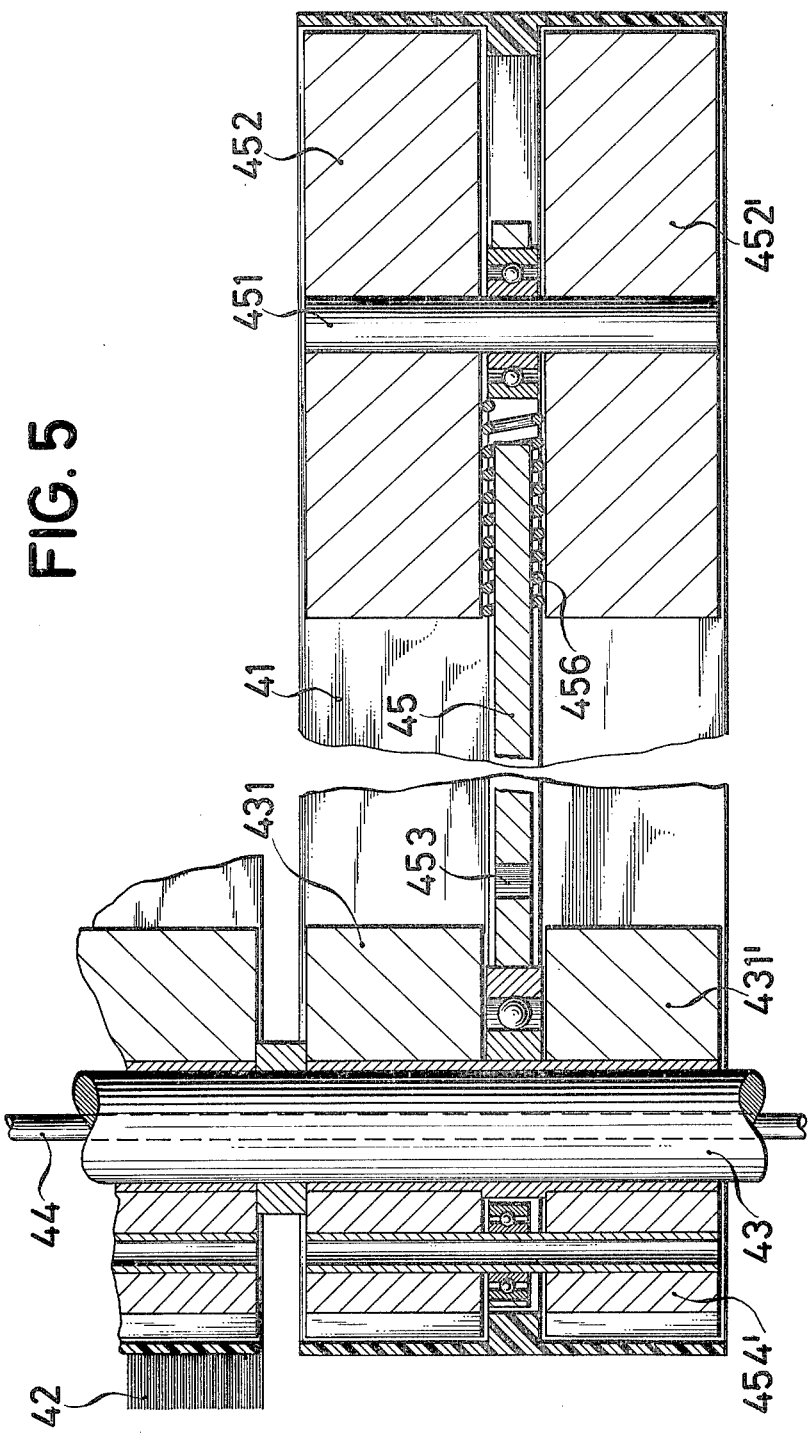
FIG. 5 shows a section taken along line V—V in FIG. 4.

In the embodiment of FIGS. 4 and 5, the portions of bodies of rotation are formed by endless belts 41 lined on the outside surface with bristles 42; these belts are in contact with drive pulleys 431/431' mounted on driveshaft 43 on one side and on the free end travel on deflection wheels 452/452' mounted on driveshaft 451 arranged on guides 45.

The frictional connection between the drive pulleys 431/431' and the revolving belt 41 is ensured by a compression spring 456 which is mounted in guide 45 and contacts axis 451 of deflection wheel 452/452'.

To restrict the pivotal region of the portions of bodies of rotation, there is a stop 44 which travels in a groove 453 in the guide arms 45 seated on driveshaft 43. The guide 45 projecting on the drive side beyond driving pulley 431/431' with support rollers 454/454' for the revolving belt arranged in the deflection zone, makes possible a desirable large pivotal region for the rotating body portions. The stop can be a jet tube.

The mode of operation of these rotating body portions is similar to the operation of the embodiment of FIGS. 2 and 3.

The running surface of the drive wheel may be roughened to improve belt traction.

I claim:

1. Apparatus for processing the surface of bodies of irregular contours, comprising: a rotatable body; a drive shaft mounted in said rotatable body for driving said body, said body being held against a surface to be processed; said rotating body comprising a plurality of sections held against said surface, said sections carrying processing means for said surface, said sections of said rotating body being eccentrically penetrated by said drive shaft; drive wheels arranged on said drive shaft and acting from the inside on each of said sections; guide means pivotal relative to said drive shaft and relative to said sections for positioning said sections on said shaft.

2. Apparatus as defined in claim 1, wherein said sections comprise rigid hollow cylindrical sections.

3. Apparatus as defined in claim 2, wherein said drive wheels are friction wheels contacting said hollow cylindrical sections.

4. Apparatus as defined in claim 3, wherein said drive wheels are guided in a recess on the inside of said hollow cylindrical sections.

5. Apparatus as defined in claim 2, including internal gear rings associated with said hollow cylindrical sections, said drive wheels comprising pinions engaging said internal gear rings.

6. Apparatus as defined in claim 1, wherein said sections comprise endless belt means contacting said drive wheels.

7. Apparatus as defined in claim 6, including deflection wheels, said drive wheels and said deflection wheels having recesses, said belt means having an internal surface shaped to correspond to V-belts and contacting said drive wheels and deflection wheels.

8. Apparatus as defined in claim 6, wherein said drive wheels have roughened relatively running surfaces.

9. Apparatus as defined in claim 6 wherein said guide means comprises guides projecting beyond said drive wheels at a level for permitting contact of said belt means only at a rear side of said drive wheels.

10. Apparatus as defined in claim 1 including bearing means for mounting said guide means on said drive shaft.

11. Apparatus as defined in claim 1 including roller means for mounting said guides on said sections.

12. Apparatus as defined in claim 1 including spacer sleeves located on said drive shaft for spacing said sections.

13. Apparatus as defined in claim 1 including stop means extending through said sections and restricting pivotal motion of said sections.

14. Apparatus as defined in claim 13, wherein said stop means comprises a movable stop.

15. Apparatus as defined in claim 1 including restoring spring means for counteracting pivotal motion of said sections.

16. Apparatus as defined in claim 15, wherein said restoring spring means apply a spring force exceeding a torque applied by said drive shaft.

* * * * *